UNITED STATES PATENT OFFICE.

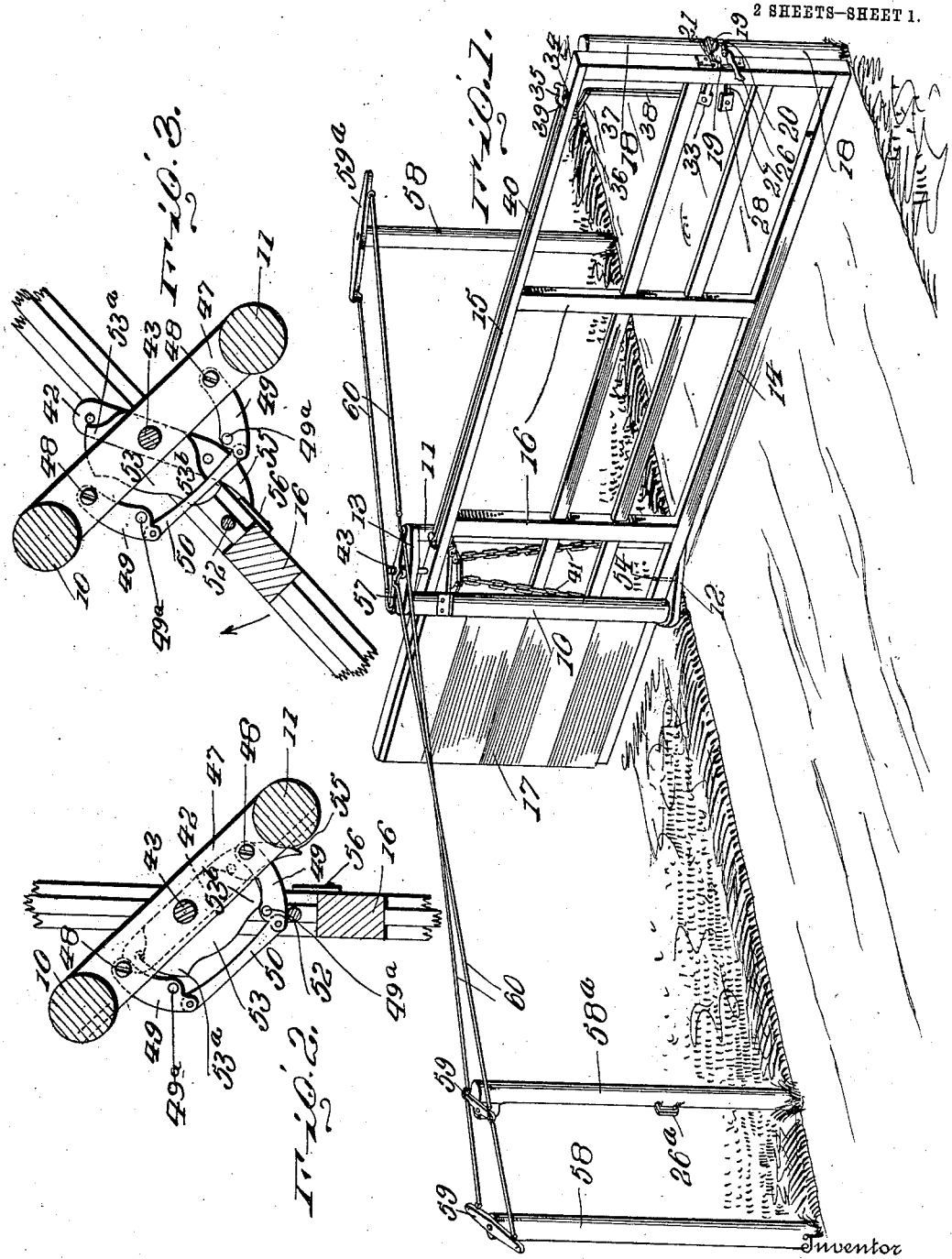

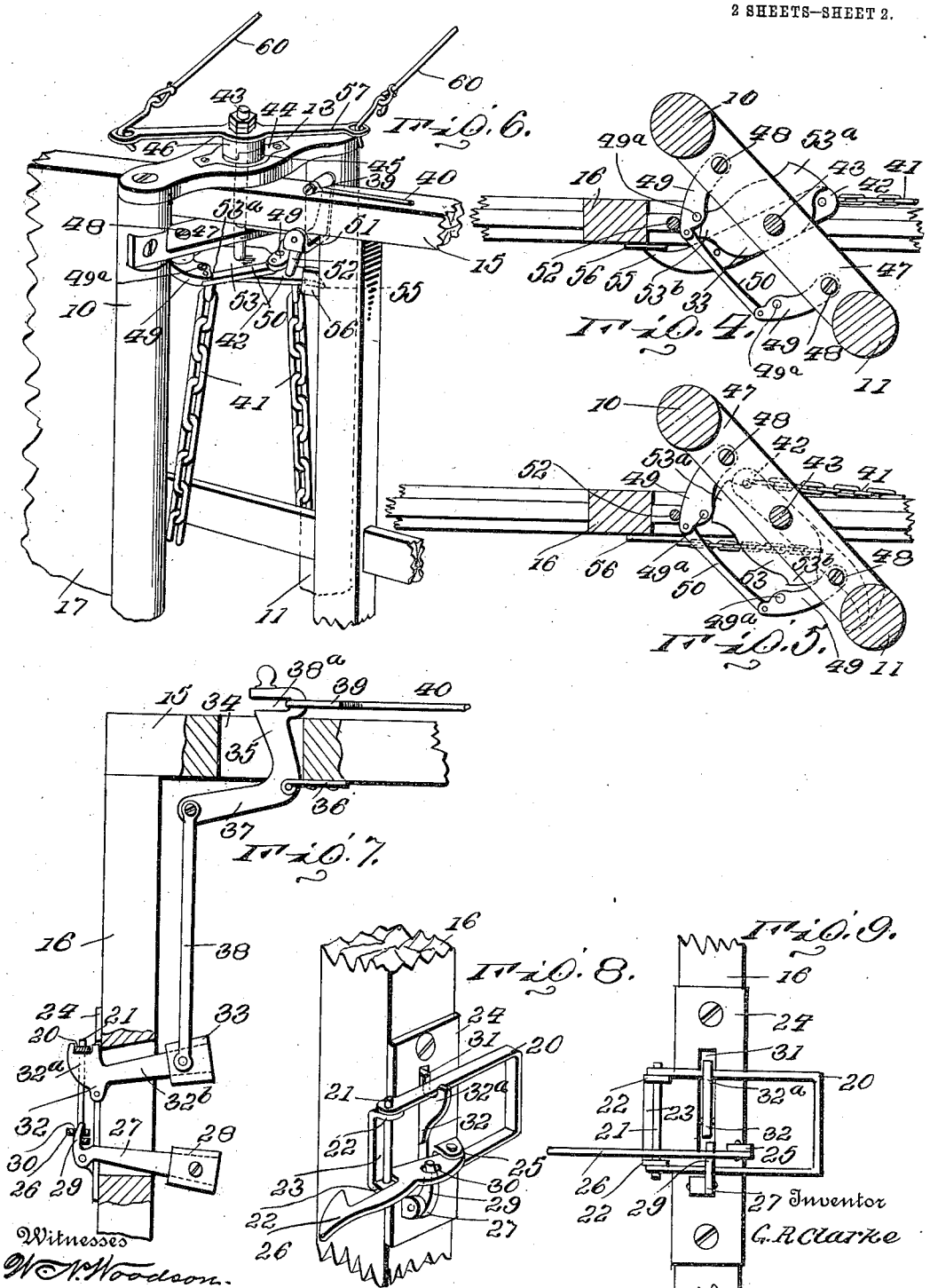

GEORGE R. CLARKE, OF MONTELL, TEXAS.

SELF-CLOSING FARM-GATE.

997,753.

Specification of Letters Patent. Patented July 11, 1911.

Application filed October 20, 1910. Serial No. 588,059.

*To all whom it may concern:*

Be it known that I, GEORGE R. CLARKE, a citizen of the United States, residing at Montell, in the county of Uvalde and State of Texas, have invented certain new and useful Improvements in Self-Closing Farm-Gates, of which the following is a specification.

This invention relates to an improved gate, especially to a novel mechanism for operating the same.

The invention has for an object to provide a gate with means whereby the operator, whether on foot or in a vehicle, opens the gate upon approaching the same by pushing an operating lever in the direction in which the operator is moving, and closes the gate by pushing a second operating lever, located at the opposite side of the gate, in the direction in which the operator is moving after passing through the gate. This improved gate is thus adapted particularly to roadways where wagons and other vehicles pass through, and where the operator does not have to leave his seat.

Another object of this invention is to provide a gate with an improved mechanism operable by a slight movement of the arm of the party opening and closing the gate.

For a full understanding of the invention reference is to be had to the following description and accompanying drawings, in which:—

Figure 1 is a perspective view of the improved gate in a closed position. Fig. 2 is a fragmentary sectional view of the inner end of the gate and the support therefor, showing the gate closed. Fig. 3 is a similar view showing the gate partly open. Fig. 4 is a view of the same showing the gate open. Fig. 5 is a view similar to Fig. 4 disclosing the mechanism about to release the latch and close the gate. Fig. 6 is an enlarged detail perspective view of the support and the inner end of the gate mounted therein. Fig. 7 is a sectional view of the outer end of the gate, showing the latch mechanism carried thereby. Fig. 8 is a detail perspective view of the latch. Fig. 9 is a front elevation of the same.

Corresponding and like parts are referred to in the following description and indicated in all the views of the accompanying drawings by the same reference characters.

Referring to the drawings the numerals 10 and 11 designate a pair of spaced posts which are mounted upon a base 12 and are reinforced at their upper ends by a crossbar 13. The posts 10 and 11 form the support or mounting of the device, and a gate is mounted in the support comprising spaced longitudinal beams 14 and 15 forming respectively the bottom and top of the gate, and being reinforced by cross-bars 16. The gate can be of any desired structure suitable for the improved mechanism. The gate is provided at its inner end with a weight 17 supported upon the inner extensions of the beams 14 and 15 and beyond the support. The posts 10 and 11 are mounted upon the base 12 in diagonal alinement so that the gate rests against the inner side of the post 11 when closed. A gate post 18 is mounted in the ground in registration with the support and is spaced from the same a distance equal to the length of the gate. The post 18 is provided with a catch 19 in the form of a rib projecting from the plate secured to the post 18 and having a shoulder for the reception of a bail 20. The bail 20 is hinged upon a vertical pin 21 supported through a pair of spaced ears 22 turned outwardly from the opposite edges of an extension 23 formed at one side of a plate 24. The plate 24 is secured against the outer edge of the gate, and the bail 20 passes loosely across the outer face of the same. The plate 24 is further provided with a projection 25 upon which is hinged the inner end of a locking pawl 26. The pawl 26 is hinged at the opposite side of the plate 24 and extends beyond the outer edge of the extension 23. A weight-arm 27 is hinged upon the lower end of the plate 24 and passes through the plate and the end-24 and passes through the plate and the end bar of the gate where it supports a suitable weight 28. The inner end of the weight-arm 27, or the pivoted end thereof, is provided with a short arm 29 arranged at substantially right angles to the arm 27 and engaging loosely through an opening 30 formed within the pawl 26 adjacent to its pivoted end. The weight 28 is employed in holding the pawl 26 normally in a closed position. The plate 24 is longitudinally slotted, as at 31, and carries midway of its ends a bell-crank lever 32 having the short arm 32$^a$ thereof recessed to loosely receive the upper bar of the bail 20. The long arm 32$^b$ of the bell-crank lever 32 projects inwardly through the cross-bar 16 of the gate and is provided with a suitable weight 33.

The weight 33 normally holds the short arm 32ª against the outer face of the plate and retains the bail 20 in a closed position.

The upper bar 15 of the gate is recessed adjacent to its outer end as at 34 to receive the upper arm 35 of a bell-crank lever which is hinged upon a plate 36 secured against the under edge of the beam 15. The horizontal arm 37 of the bell-crank lever is connected by a rod 38 to the outer end of the arm 32ᵇ so as to communicate motion between the two bell-crank levers. The arm 35 of the bell-crank lever is undercut as at 38ª to receive the loop 39 formed upon the extremity of a rod 40 adapted to release the improved latch.

The lower beam 14 is provided at its opposite sides and in spaced relation with supporting chains 41 which pass upwardly between the posts 10 and 11 and are attached to a cross-arm 42 adjacent to its ends. The cross-arm 42 is rigidly attached to the lower end of a turning rod 43 secured through the cross-bar 13. The cross-arm 13 is provided at its central portion with a bearing-plate 44 having a boss 45 upon its upper face with a shouldered upper edge corresponding to an interfitting sleeve 46 carried rigidly upon the upper end of the rod 43. The interfitting shoulders upon the boss 45 and the sleeve 46 determine the position of the arm 42 upon the opening and closing of the gate. A brace 47 is secured between the posts 10 and 11 and is suitably apertured for the reception of the turning rod 43. The brace 47 is located beneath the upper beam 15 of the gate. The brace 47 is provided with a pair of spaced pins 48 upon which are hinged the inner ends of the arms 49. The outer ends of the arms 49 are connected to each other by a link 50. The beam 15 of the gate carries pivotally mounted at its inner end a latch releasing lever 51 which is of substantially U-form and engaging against the upper and lower edges of the beam. The lower arm of the lever 51 is provided with a stud 52 depending therefrom for engagement against the outer edge of the arms 49 and of the link 50. The upper arm of the lever 51 is hingedly attached to the connecting rod 40 by means of which the latch mechanism is released. The turning rod 43 is provided with a cam 53 having the projections 53ª and 53ᵇ thereof projecting in diametrically opposite relation and arranged to engage beneath the inner edges of the arms 49. The arms 49 are provided with depending studs 49ª adapted for registration with the projections 53ª and 53ᵇ. The lower beam 14 of the gate is provided with a supporting pin 54 which projects downwardly and through the base-plate 12 to center the lower end of the gate. One end of the arm 42 extends outwardly to form a finger 55 adapted to engage against a lip 56 extending inwardly from the inner end of the gate and in the path of the finger 55.

It will be noted from the drawings that the arm 42 is rigid with the cam 50 so that the same operate simultaneously.

The upper end of the turning rod 43 is provided with an operating lever 57, the ends of which extend diametrically opposite in substantially the same plane as the arm 42.

The improved gate is provided with an inner auxiliary post 58 which is disposed in longitudinal and spaced registration from the support of the gate, and which carries a swingable crossed arm 59ª. At the outer side of the gate an auxiliary post 58ª is positioned in longitudinal registration with the gate support and spaced from the support a distance equal to the length of the gate so as to register the cleat 26ª with the pawl 26. A second auxiliary post 58 is spaced outwardly from the post 58ª and is adapted to operate in conjunction with the opposite post 58 at the inner side of the gate to effect the operation of the gate. Swingable cross arms 59 are carried upon the upper ends of the posts 58ª and 58. The operating lever 57 of the support is connected by crossed rods 60 to the cross arms 59 and 59ª. The posts 58 are spaced from the opposite sides of the gate a sufficient distance to admit of the opening and closing of the gate by the operator without leaving a vehicle. The rods 60 are crossed for the purpose of imparting movement in opposite directions of the cross arms 59 and 59ª and the operating lever 57.

In operating the gate, as the driver approaches the same with a vehicle, the driver grasps the adjacent cross-arm 59 and pushes the same toward the gate. The connecting rods 60 are in crossed relation in one side so as to impart an opposite movement to the main cross-arm 57. When the gate is in the position disclosed in Figs. 1 and 2, and the operator desires to pass through the gate, the operator turns the cross-arm 59 toward the gate, or in the direction in which he is traveling to effect the rotation of the turning rod 43. This rotation of the rod 43 brings the cam 53ᵇ against the depending studs 49ª of the adjacent arm 49 and swings both the arms 49 and the link 50 toward the inner end of the gate. The outer end of the arm 49 strikes against the stud 52 depending from the operating lever 51. The upper end of the lever 51 swings toward the inner end of the gate and draws the connecting rod 40 to raise the bell-crank lever arm 37. As the arm 37 is raised the rod 38, connected thereto, raises the weight 33 and its adjacent arm 32ᵇ to move the short arm 32ª outwardly from the plate 24 and to thereby swing the bail 30 away from the catch 19. As soon as the bail 20 is raised from the catch 19, the finger 55 of the cross-arm 42 strikes against the lip 56 upon the gate, and further rotation of the arm 42 swings the gate into an open position against the post 58ª. This position of the gate and its support is disclosed to advantage in Fig. 4. The sleeve 46 is rotated to bring the squared lower edge thereof against the inclined upper edge of the boss 45 so as to frictionally hold the gate in an open position. The turning of the rod 43 twists the chains 41 and rotates the gate by its weight under the torsional movement of the chains 41. After the operator passes through the gate and desires to close the same, he turns the cross-arm 59ª to swing the turning rod 43 in the opposite direction. In this movement the projection or cam 53ª strikes against the inner face of the opposite arm 49 and draws the same outwardly against the stud 52. The swinging of the stud 52 releases the pawl 26 from the cleat 26ª carried against the outer face of the post 58ª. This action of the pawl 36 is effected by the swinging of the short arm 32ª beneath the bar 20 and draws the bail outwardly by reason of the contact of the arm 32ª therewith. As the bail swings outwardly the short arm 30 is drawn therewith to raise the pawl 36 by reason of its connection with the short arm 30.

The weight 17 of the gate is adapted to balance the outer end of the same so as to dispose the weight of the gate upon the pin 54 and to relieve the turning rod 43 of the lateral strain incident to supporting the entire weight of the gate.

It will be noted that when the operator is on foot or on horseback and desires to open the gate it is necessary only to raise the vertical arm 35 of the bell-crank lever and move the same back within the link upon the outer end of the rod 40 to release the latch mechanism without turning the link 50. The operator now swings the gate open and passes through. Should the operator not think to close the gate it will automatically close by its own weight as it rests upon the chains 41 which are turned out of their parallel and vertical position. As the link 50 has not been moved it holds the U-shape lever 51 out and prevents the latch engaging with the post 37 to hold the gate in an open position. It is thus seen that the gate will automatically close unless it is latched by withdrawing the link 50, which operation is effected only by the turning of the operating lever 37.

Having thus described the invention what is claimed as new is:—

1. A device as specified including a support, a gate hinged within the support, a turning rod disposed through the upper end of the support and the gate, a cross-arm carried upon the lower extremity of the turning rod, chains connecting the ends of the turning rod to the lower bar of the gate for supporting the same, a latch mechanism carried by the gate, and operating means carried by said turning rod for releasing the latch mechanism and swinging said gate.

2. A device as specified including a support, a gate hinged in the support, a cross-arm mounted in the support and adapted to turn in the plane of the gate, operating means disposed between the arm and the gate for swinging the latter, a latch mechanism carried upon the outer end of the gate, and connecting means disposed between said cross-arm and said latch mechanism for operating the same.

3. A device as specified including a support having a cross-bar, a gate hinged within the support beneath the cross-bar, a turning rod disposed through the cross-bar, a cross-arm mounted upon the lower end of the turning rod, chains depending from the ends of said cross-arm and secured in spaced relation against the opposite sides of said gate, a latch mechanism disposed upon the outer end of the gate, a releasing lever hinged upon the inner end of the gate and having connection to said latch mechanism, and a cam carried upon said turning rod having diametrically opposite projections for alternate engagement with said operating lever upon the opening and closing of the gate.

4. A gate mechanism including a vertical support, a gate hinged in the vertical support, a post disposed in registration with the outer end of the gate, a latch mechanism carried by the gate for engagement with the post, a bell-crank lever carried by the gate and connected by the latch mechanism for operating the same, a link carried by the support and adapted to be extended at times, a U-shaped lever hinged upon the gate and loosely connected to the bell-crank lever for engagement with the link to release the latch mechanism at times, and an outer post registering with the end of the gate when open for engagement with the latch mechanism.

In testimony whereof, I affix my signature in presence of two witnesses.

GEORGE R. CLARKE. [L. S.]

Witnesses:
E. L. WHITFIELD,
O. D. COLEMAN.